(12) United States Patent
Takamatsu et al.

(10) Patent No.: US 7,355,313 B2
(45) Date of Patent: Apr. 8, 2008

(54) STATOR, SPINDLE MOTOR, AND RECORDING DISK DRIVING APPARATUS

(75) Inventors: Hiromitsu Takamatsu, Kyoto (JP); Mineo Kurita, Kyoto (JP); Masato Gomyo, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 11/306,388

(22) Filed: Dec. 27, 2005

(65) Prior Publication Data

US 2006/0197401 A1  Sep. 7, 2006

(30) Foreign Application Priority Data

Dec. 27, 2004  (JP) .............................. 2004-375292

(51) Int. Cl.
*H02K 1/00* (2006.01)

(52) U.S. Cl. ..................................... 310/216; 310/67 R

(58) Field of Classification Search ................ 310/216, 310/67 R, 99, 90
See application file for complete search history.

(56) References Cited

U.S. PATENT DOCUMENTS

| | | | | |
|---|---|---|---|---|
| 3,123,747 A | * | 3/1964 | Glass .......................... | 335/210 |
| 4,200,344 A | * | 4/1980 | Binns et al. .................. | 384/107 |
| 5,317,225 A | * | 5/1994 | Miyaji et al. ............. | 310/67 R |
| 5,604,389 A | * | 2/1997 | Nitta et al. ............... | 310/67 R |
| 5,874,796 A | * | 2/1999 | Petersen ................. | 310/156.45 |
| 2003/0197438 A1 | * | 10/2003 | Oku ............................ | 310/90 |
| 2006/0170297 A1 | * | 8/2006 | Jyono et al. .................. | 310/90 |
| 2006/0197401 A1 | * | 9/2006 | Takamatsu et al. ......... | 310/216 |

FOREIGN PATENT DOCUMENTS

| | | |
|---|---|---|
| JP | S61-147765 A | 7/1986 |
| JP | H04-251541 A | 9/1992 |
| JP | H11-032466 A | 2/1999 |
| JP | H11-041891 A | 2/1999 |

* cited by examiner

*Primary Examiner*—Darren Schuberg
*Assistant Examiner*—Hong-Vinh Nguyen
(74) *Attorney, Agent, or Firm*—Volentine & Whitt, PLLC

(57) ABSTRACT

Spindle-motor stator includes at least a first core sheet and at least one or more second core sheets located next to an end core sheet. A bent portion bent upward and a protrusion extending upward from the bent portion are formed at the forward end of the plurality of the first core sheet. Each of the plurality of teeth is wound with a conductive wire.

10 Claims, 7 Drawing Sheets

STATOR, SPINDLE MOTOR, AND RECORDING DISK DRIVING APPARATUS

BACKGROUND OF THE INVENTION

1. Field of the Invention

This invention relates to a stator, a spindle motor, and a recording disk driving apparatus, or in particular to a thin spindle motor.

2. Description of the Related Art

With the recent improvement in the storage capacity density of the hard disk, demand has increased more and more for a smaller hard disk drive. Further, applications to the portable devices have spread. The portable devices are often used in an environment liable to be subjected to vibrations and shocks, and therefore required to have a high durability against external forces. An increased durability against external forces requires an increased rigidity of the bearing, resulting in an increased bearing friction loss. On the other hand, a power supply such as a dry cell or a storage battery not large in power capacity is often used for the portable devices, and a reduced power consumption is also required.

FIG. 7 is a longitudinal sectional view showing the structure of a conventional spindle motor. The spindle motor 100 of FIG. 7 classified as a brushless motor includes a fixed assembly 23 having a stator 131, a rotor 21 having a rotor magnet 132 and a bearing 22.

The stator 131 includes a plurality of teeth, a core back magnetically connected to the outer periphery or the inner periphery of the teeth and a coil wound on each of the teeth. The teeth and the core back are formed by stacking a plurality of core sheets molded from a silicon steel sheet high in permeability. The annular rotor magnet 132 is opposed radially to the teeth.

FIG. 6 shows another example of a conventional spindle motor. In the spindle motor shown in FIG. 6, the end portion of the uppermost core sheet 134a opposed to the rotor magnet is bent axially upward. With this structure, the teeth radially opposed to the rotor magnet 132 have so large an area that the magnetic fluxes of the rotor magnet 132 can be efficiently utilized. In other words, a large torque constant is obtained. Even in the case where the current flowing in the coil 131a is reduced, therefore, a torque equivalent to the current not reduced in the structure with the core sheet not bent is obtained, thereby making it possible to reduce the power consumption.

Nevertheless, several problems are encountered to further reduce the thickness of this spindle motor 100.

The silicon steel sheet finding wide application as a core sheet is often formed by pressure rolling and has its own limit of reducing the thickness. To reduce the thickness of the spindle motor, therefore, the number of the core sheets stacked is required to be reduced.

The magnitude of displacement from the ideal angle when the single core sheet 134a is bent, i.e. the bending margin (D1 in FIG. 6) is in the range of about 0.5 to 1.5 times the thickness (D2 of FIG. 6) of a single core sheet.

In the spindle motor shown in FIG. 6, the bending margin D1 of the core sheet 134 may happen to be radially opposed to the portion of the rotor magnet 132 having a large magnetic flux density.

In the case of a motor having an axial thickness of less than 10 mm, on the other hand, about two to five core sheets are stacked, and therefore, the axial height of the bending margin of the core sheet represents a proportion not negligible of the axial height of the rotor magnet.

In the bending margin of the core sheet, the radial interval between the magnet and the plurality of teeth is larger than the ideal radial interval between the rotor magnet and the stator. The force generated by the magnetic interaction is decreased in inverse proportion to the square of distance. Even in the case where the core sheet is bent, therefore, the torque constant cannot be sufficiently improved.

With the decrease in thickness, the core sheet cannot be bent by a sufficient length and therefore it is difficult to secure the length of the bent portion.

Further, in the case where the inner peripheral portion of the teeth is processed after stacking a plurality of core sheets, the interval between the stacked core sheets may be widened, often resulting in an uneven thickness of the stator core. Thus, the axial attraction force of the stator with the motor driven is changed, with the result that the electromagnetic noises are occasionally increased or the bearing performance reduced. This trend is especially conspicuous with a thin spindle motor. Also, in the case where the spindle motor is mounted on a portable device, the noises generated are unpleasant to the user, while the lower bearing performance reduces the driving efficiency and hampers the longer life of the motor.

BRIEF SUMMARY OF THE INVENTION

A stator as an example of the present invention includes a first core sheet located at a radial end of the stator, at least one or more second core sheets located next to the end core sheet, and a conductive wire wound on each of a plurality of teeth.

The stator is laminated by the first core sheet and the second core sheets, and the stator has the plurality of teeth extending in radial direction.

The first core sheet has a bent portion bent in axial direction from the first core sheet to the second core sheets at the forward end and the first core sheet has a protrusion at the tip of the bent portion.

According to the present invention, there is also provided a high-efficiency stator and a spindle motor including this stator.

Also, according to the invention, there is provided a small, thin stator and a spindle motor including this stator.

This invention is applicable also to a recording disk driving apparatus satisfying the recent demand for small thickness and small power consumption.

DETAILED DESCRIPTION OF THE INVENTION

Figure 1:
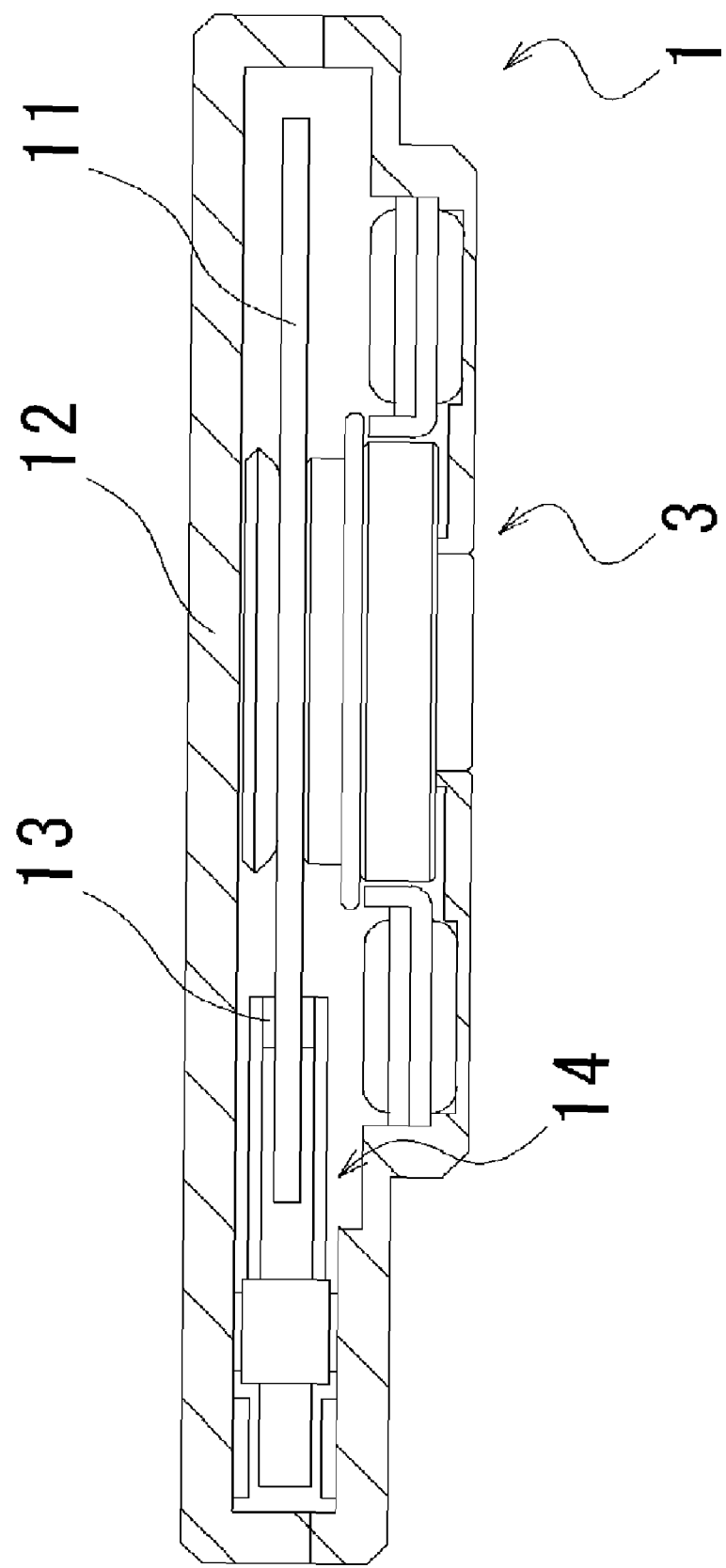
FIG. 1 is a longitudinal sectional view showing a hard disk drive using a spindle motor according to a first embodiment of the invention.

With reference to FIGS. 1 to 5, an embodiment of the invention is explained. In the description of the invention, the relative positions and the four directions of the members described herein are those as viewed in the drawings but not those in which the members are actually built in the devices.

First Embodiment

FIG. 1 shows a hard disk driving apparatus having a spindle motor 3 according to the invention. The hard disk driving apparatus 1 using the spindle motor 3 according to the invention includes a housing 12 forming an internal space. The housing 12 has arranged therein the spindle motor 3, a hard disk (recording disk) 11 in which information can be recorded, and an access unit having a head 13 for reading/writing information on the disk and a head assembly 14 for supporting and moving the head 13 to an arbitrary position on the disk.

Figure 2:
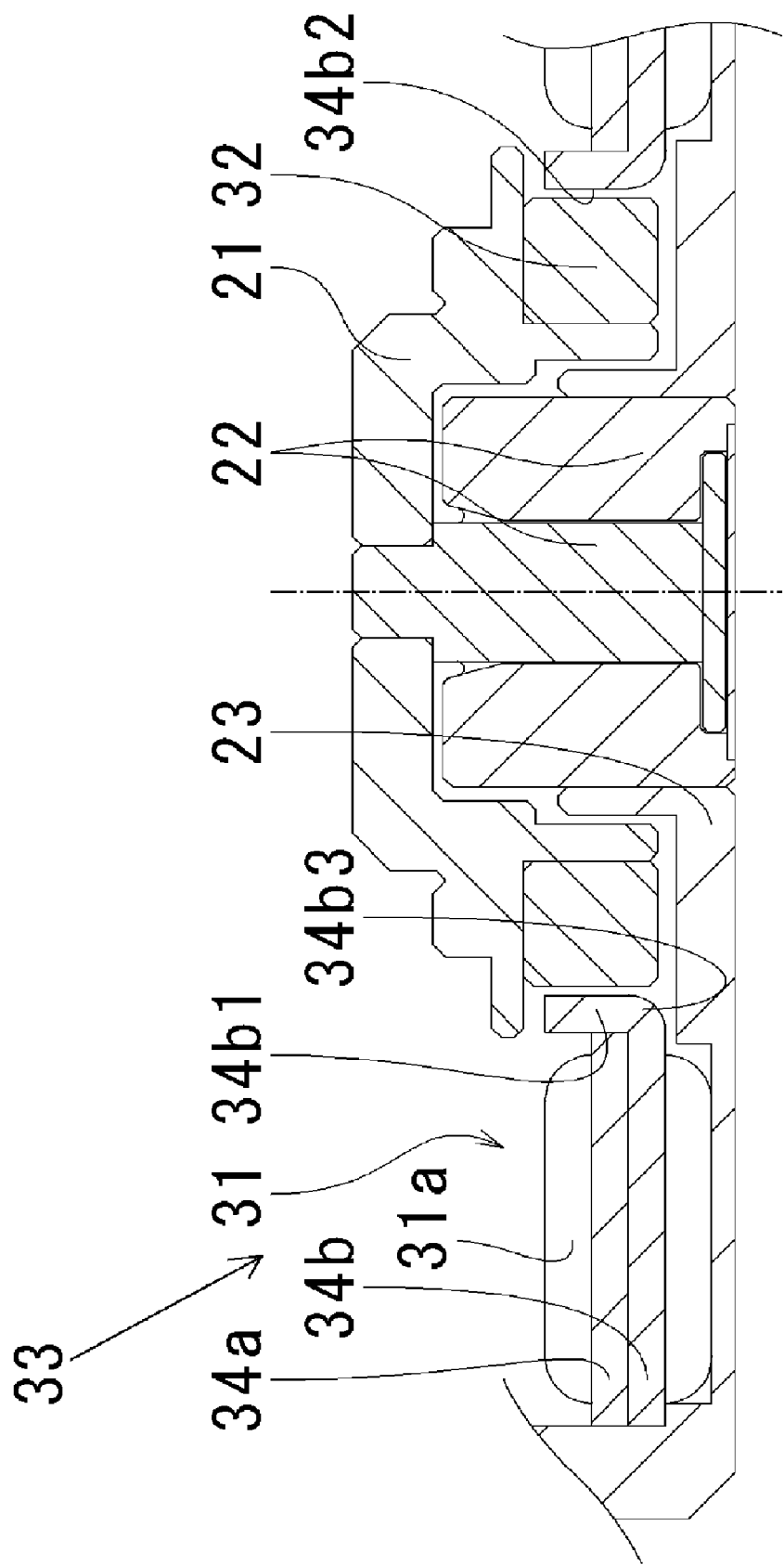
FIG. 2 is a longitudinal sectional view showing the spindle motor according to the first embodiment of the invention.

FIG. 2 is a longitudinal sectional view including the center axis of the spindle motor 3 according to the invention. The spindle motor 3 includes a rotor hub 21 having a surface on which the hard disk 11 is mounted, a base plate 23 forming a part of the housing 12 and a bearing 22 for rotatably supporting the rotor hub 21.

The bearing 22 is a slide bearing including a shaft, a sleeve fitted in the gap of the shaft and a lubricating oil interposed between the shaft and the sleeve. The slide bearing may be a dynamic bearing with a dynamic pressure groove formed in the shaft and the sleeve, or a roll bearing configured of a rotary member (ball or cylindrical member) between outer and inner rings.

Figure 3:
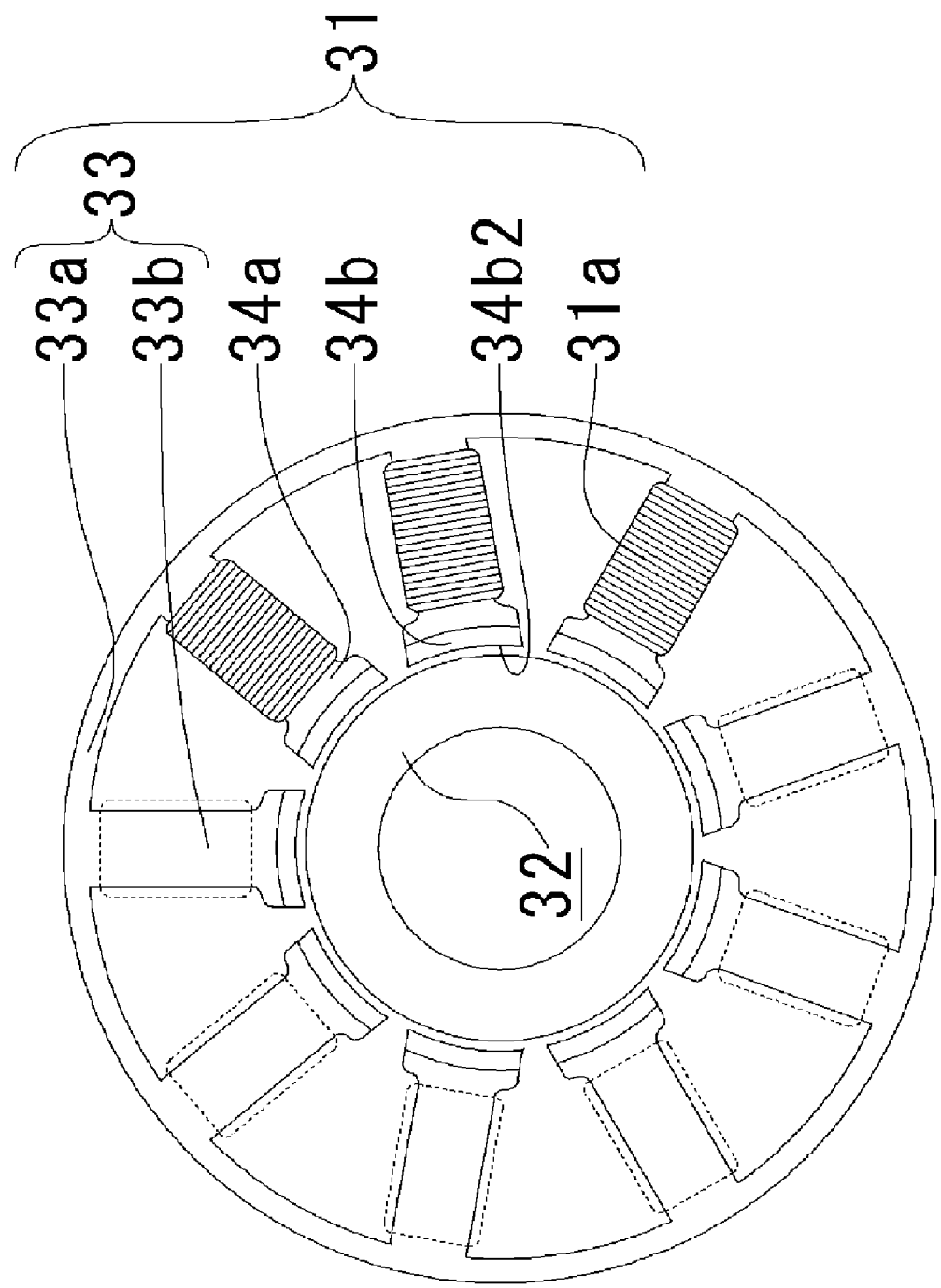
FIG. 3 is a plan view showing a stator and a rotor magnet of the spindle motor shown in FIG. 1.

FIG. 2 is a longitudinal sectional view showing a stator 31 and a rotor magnet 32 constituting the essential parts of the spindle motor according to the invention. FIG. 3 is a plan view, taken from above in FIG. 2, showing the stator 31 and the rotor magnet 32 constituting the essential parts of the invention. In FIG. 3, the conductive wires 31a are shown by dashed lines and partly omitted for the convenience of explaining the stator core 33.

The stator core 33 includes an annular core back 33a located on the outer periphery of the stator 31, and a plurality of teeth 33b connected magnetically with the core back 33a and extending radially inward from the core back 33a while being radially arranged around the center axis thereof. The stator core 33 includes two core sheets 34a, 34b. The second core sheet 34a is stacked on the upper surface of the first core sheet 34b. The first core sheet 34b and the second core sheet 34a each includes an annular core back piece and a plurality of teeth pieces extending radially inward from the core back piece. The stator core 33 is an assembly in which the second core sheet 34a is stacked on the upper surface of the first core sheet 34b.

An protrusion 34b1 is formed at the inner peripheral end (forward end) of the first core sheet 34b. The outer peripheral surface of the protrusion 34b1 is arranged radially inward of the inner peripheral end of the second core sheet 34a, and the inner peripheral surface of the protrusion 34b1 is opposed to the outer peripheral surface of the radially magnetized rotor magnet 32 with a radial gap therebetween. The upper end of the protrusion 34b1 is projected axially upward from the upper end surface of the second core sheet 34a.

A bent portion 34b3 having the same height as the axial height of the bending margin is formed under the protrusion 34b1. The bent portion 34b3 is upwardly bent from the inner peripheral end of the first core sheet 34b. The protrusion 34b1, the bent portion 34b3, and the first core sheet 34b are seamlessly formed with one component. A part of the bent portion 34b3 is radially opposed to the rotor magnet 32. The radial gap between the bent portion 34b3 and the outer peripheral surface of the rotor magnet 32 is larger than that between the inner peripheral surface of the protrusion 34b1 and the rotor magnet 32. Therefore, the bent portion 34b3, as compared with the protrusion 34b1, has a small magnetic interaction with the rotor magnet 32. In view of the fact that only a part of the bent portion 34b3 is opposed to the rotor magnet 32, the torque reduction can be suppressed more than in the prior art in which the whole bent portion is opposed to the rotor magnet.

Also, the bent portion 34b3 is not opposed to the center of the magnetic pole of the rotor magnet 32, and therefore the effective area of the opposed surfaces of the stator 31 and the rotor magnet 32 can be increased. As a result, the torque constant can be increased thereby improving the motor efficiency.

This invention finds suitable application especially to implement a thin spindle motor having an axial thickness of not more than 10 mm (more preferably, not more than 5 mm). Such a motor has few core sheets in stack and therefore the ratio which the bending margin of the core sheet represents of the axial height of the stator core is large. As a result, this invention can increase the faced areas of the rotor magnet and the teeth.

Also, according to the first embodiment, the area of the portion of the stator effectively opposed to the rotor magnet can be increased within the portion of the rotor magnet having a large magnetic flux. Thus, the high-efficiency spindle motor can be reduced in thickness.

According to the first embodiment, the axial thickness of the first core sheet 34b and the second core sheet 34a is about 0.2 mm, and the stator core 33 is formed of two core sheets. The axial height of the rotor magnet 32 is about 0.7 mm, and the axial height of the protrusion 34b1 including the bending margin is about 0.6 mm. The thickness of the bending margin, on the other hand, is substantially the same 0.2 mm as the axial thickness of the single core sheet. According to this embodiment, the axial center of the stator core 33 defined as an axially intermediate position of the two core sheets is located about 0.1 mm downward from the axial center of the rotor magnet 32.

Figure 6:
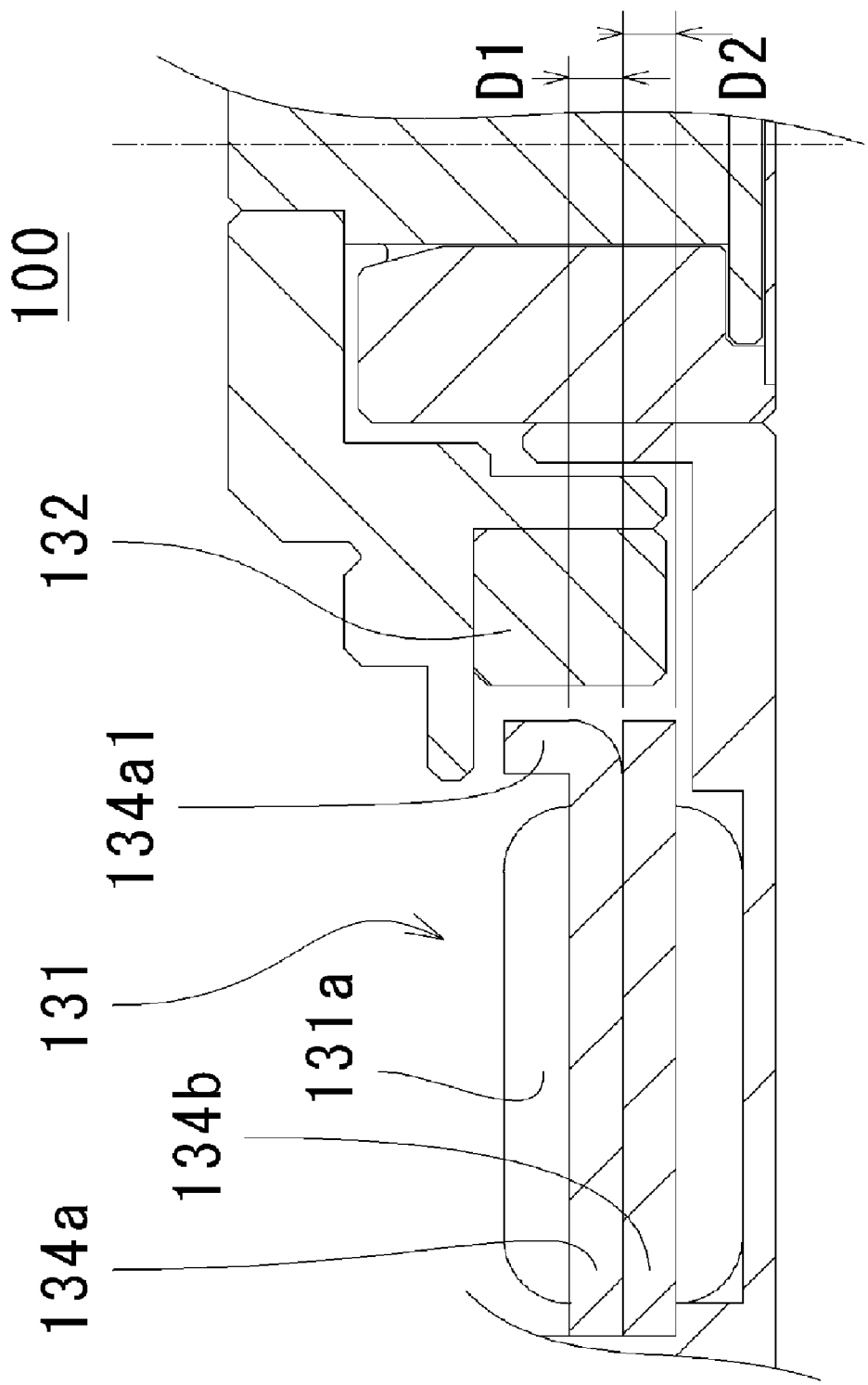
FIG. 6 is a longitudinal sectional view of a conventional spindle motor.

Also, with regard to the conventional spindle motor 100 shown in FIG. 6, an experiment is conducted under similar conditions to the first embodiment including the axial thickness of each of the two core sheets, the axial height of the rotor magnet 132, the radial thickness of the protrusion and the size of the bending margin.

Figure 7:
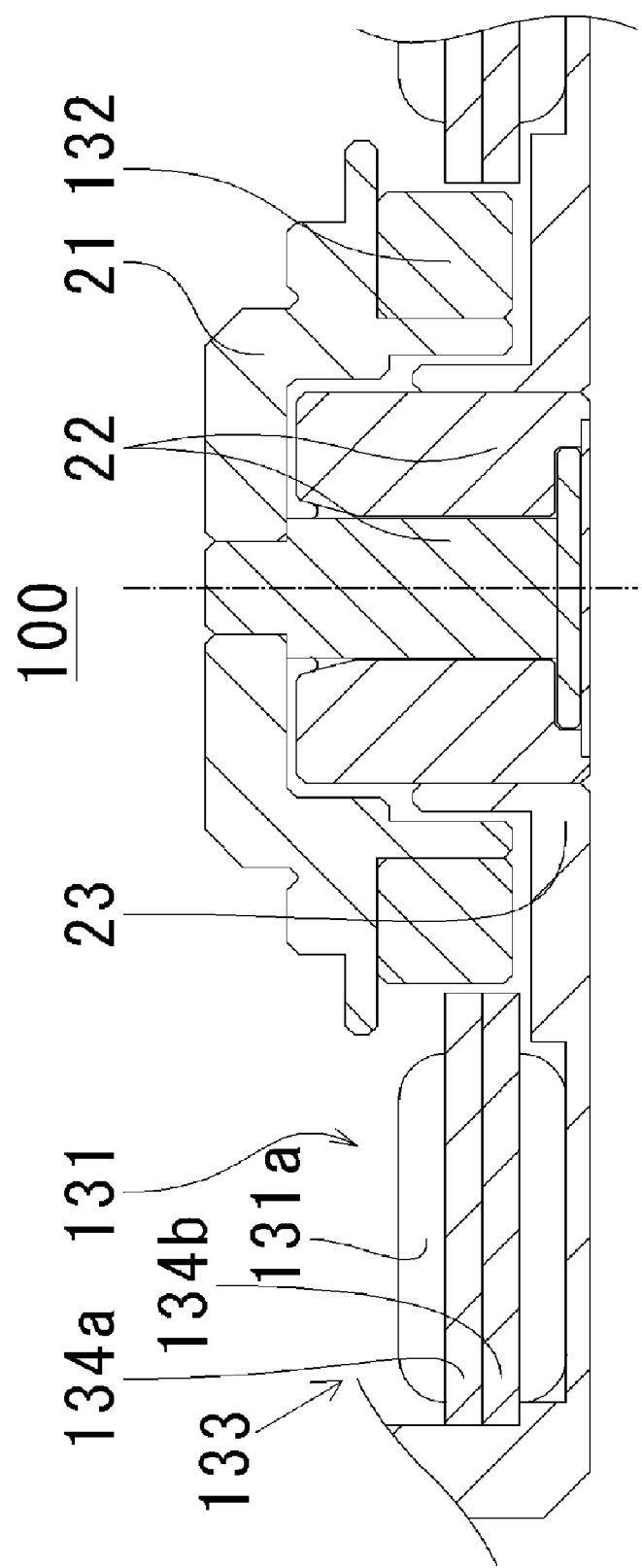
FIG. 7 is a longitudinal sectional view of a conventional spindle motor.

Further, with regard to the spindle motor 100 shown in FIG. 7, an experiment is conducted under similar conditions to the first embodiment including the axial thickness of the two core sheets 134a, 134b and the axial height of the rotor magnet 132.

As a result, the torque constant of the spindle motor 3 according to this embodiment is found to be 11% higher than the conventional spindle motor shown in FIG. 7 and about 3% higher than the conventional spindle motor shown in FIG. 6.

In the conventional motor shown in FIG. 6, the axial height of the stator 131 radially opposed to the rotor magnet 132 is dependent on the accuracy of the parts of the stator 131. In the prior art, the accuracy of the parts of the stator 131 is determined by the total of the variations of the length by which the core sheet is bent and the variations in stacking the core sheets.

According to the first embodiment, on the other hand, the parts accuracy of the stator is determined only by the bending length of the protrusion 34b1 of the first core sheet 34b. As a result, the magnetic flux amount of the stator 31 is stabilized, while at the same time improving the axial position accuracy of the stator 31 and the rotor magnet 32.

Especially with the thin motor as in this embodiment, a slight dimensional error causes an imbalance of the axial magnetic force, and the motor characteristics are greatly affected by the generation of magnetic noises and an excessive pilot pressure in axial direction. In the spindle motor 3 according to this embodiment, therefore, though very thin, individual differences are small and stable characteristics are obtained.

Further, when the inner diameter of the stator 31 is processed, the interval between the first and second core sheets is not axially widened. As a result, the variations in axial thickness of the stator core 33 are greatly reduced, so that the reduction in the bearing performance attributable to the variations of magnetic attraction force or the generation of electromagnetic noises can be suppressed. The provision of this spindle motor 3 secures the stable performance and quietude of the hard disk driving apparatus 1.

Second Embodiment

Figure 4:
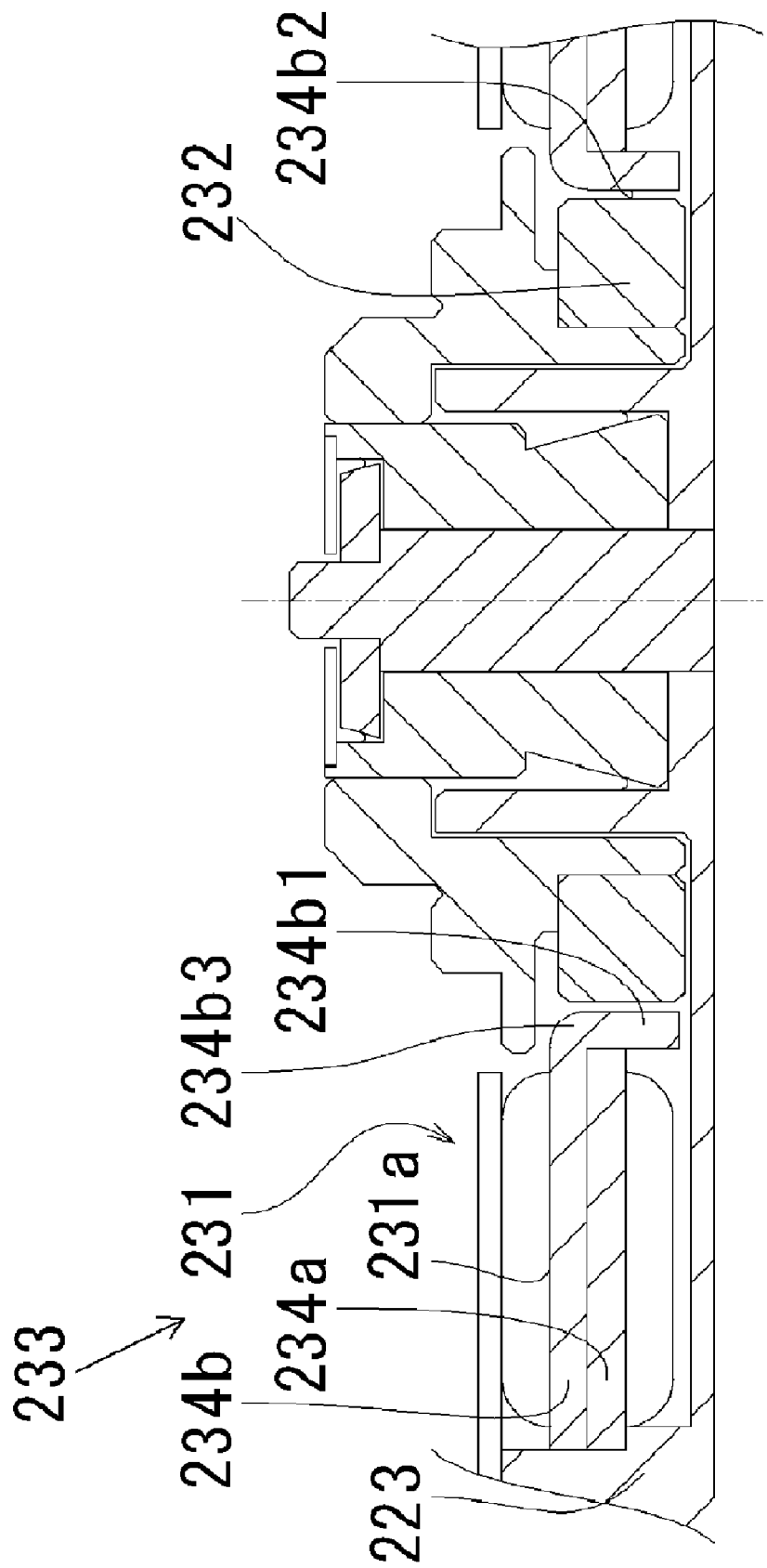
FIG. 4 is a longitudinal sectional view showing a spindle motor according to a second embodiment of the invention.

FIG. 4 is a longitudinal sectional view showing a second embodiment of the invention. As shown in FIG. 4, the stator core 231 includes a second core sheet 34a and a first core sheet 34b stacked on the upper side of the second core sheet 34a. The inner peripheral end of the teeth pieces of the first core sheet 234b is formed with a downwardly bent protrusion 234b1. The inner peripheral surface of the protrusion 234b1 is faced with the outer peripheral surface of the radially magnetized rotor magnet 232. Also, the upper side of the protrusion as viewed in FIG. 4 is formed with a bent portion 234b3.

With the configuration shown in FIG. 4, the second embodiment can produce similar operational effects to the first embodiment.

Third Embodiment

Figure 5:
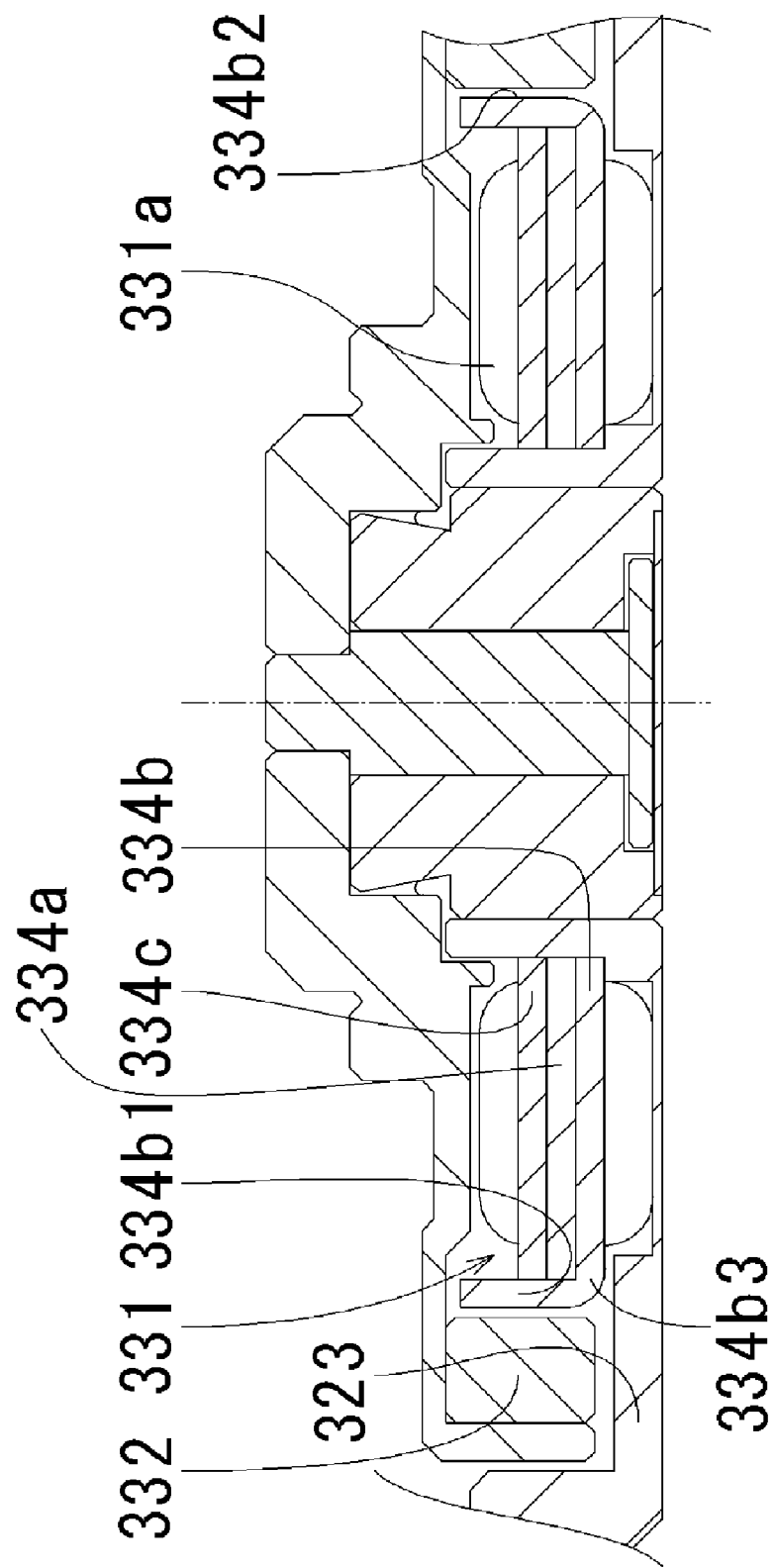
FIG. 5 is a longitudinal sectional view showing a spindle motor according to a third embodiment of the invention.

FIG. 5 is a longitudinal sectional view showing a third embodiment of the invention. The spindle motor shown in FIG. 5 has a rotor magnet 332 arranged radially outward of the stator 331.

As shown in FIG. 5, the stator 331 includes a first core sheet 334b, a second core sheet 334a stacked on the upper side of the first core sheet 334a, and a third core sheet 334c stacked on the upper side of the second core sheet 334a. The inner peripheral end of the teeth pieces of the first core sheet 334b is formed with an upwardly bent protrusion 334b1. The outer peripheral surface of the protrusion 334b1 is faced with the inner peripheral surface of the radially magnetized rotor magnet 332. Also, a bent portion 334b3 is formed on the lower side of the protrusion 334b1 as viewed in FIG. 5.

The axial height of the protrusion 334b1 including the bending margin is extended upward from the upper end surface of the third core sheet 334c. Further, the axial height of the protrusion 334b1 excluding the bending margin is preferably extended upward from the upper end surface of the third core sheet 334c.

As described above, the spindle motor having the stator 331 arranged radially inward of the rotor magnet is applicable in the invention. The spindle motor according to the first and second embodiments described above is suitably reduced in thickness and has a smaller rotary member. Especially, therefore, the invention produces the conspicuous effect to reduce the size of the spindle motor. In the spindle motor according to the third embodiment, on the other hand, the rotor magnet is covered by a substantially cup-shaped rotor hub molded from a magnetic material, and therefore the leakage magnetic fluxes are prevented. This is especially effective for the motor requiring a high torque.

This invention is applicable also to the structure in which three core sheets are stacked.

The stator, the spindle motor, and the recording disk driving apparatus according to the embodiments of the present invention are described above. The present invention, however, is not limited to those embodiments, but can be variously modified or altered without departing from the scope of the invention.

For example, the material of the core sheet may be silicon steel, ferrite, iron-group amorphous, cobalt or nickel or a similar ferromagnetic material. Also, the first core sheet and the second core sheet may be formed of different materials from each other.

The surface of the protrusion faced to the rotor magnet is not necessarily a peripheral surface. Specifically, the protrusion surface may be an arcuate surface corresponding to the peripheral surface of the rotor magnet or may have other shapes corresponding to the magnetization waveform or shape of the rotor magnet.

Also, this invention is applicable to the stator having a stack of two or more core sheets.

What is claimed is:

1. A stator for use in a motor, said stator comprising:
   first and second core sheets stacked in a stacking direction from the first core sheet to the second core sheet, wherein each of the first and second core sheets include annular portions which together form an annular core back, and plurality of teeth portions extending radially inward from the respective annular portions; and
   a conductive wire wound around the teeth portions of the core sheets to form coils,
   wherein each of the teeth portions of the first core sheet is bent such that a radially inward end portion thereof extends substantially in the stacking direction and traverses across and beyond a plane of a corresponding teeth portion of the second core sheet.

2. A stator according to claim 1, wherein the core back is magnetically connected to the teeth portions.

3. A stator according to claim 2, wherein the teeth portions extend from the core back substantially perpendicularly to the stacking direction.

4. A stator according to claim 1, further comprising a third core sheet stacked on the second core sheet.

5. A stator according to claim 1, wherein the height of the stator in the stacking direction is 5 mm or less.

6. A spindle motor comprising:
   the stator as claimed in claim 1;
   a rotor having a rotor magnet opposed to the stator; and
   a bearing unit operable to support the rotor in a rotatable manner about a rotation axis;
   wherein the stacking direction is parallel to the rotation axis of the rotation of the rotor, and the radially inward end portion of each of the teeth portions of the first core sheet is opposed to the rotor magnet in a direction substantially perpendicular to the rotation axis.

7. A spindle motor according to claim 6, wherein the rotor magnet is arranged inside the stator in the direction substantially perpendicular to the rotation axis.

8. A spindle motor according to claim 6, wherein the rotor magnet is arranged outside the stator in the direction substantially perpendicular to the rotation axis.

9. A spindle motor according to claim 6, wherein the bearing unit uses a lubricating oil.

10. A disk drive comprising:

the spindle motor as claimed in claim 6; and an access unit operable to perform at least reading information from and writing information onto a disk capable of storing the information therein.

* * * * *